United States Patent [19]

Wideman et al.

[11] Patent Number: 5,504,127
[45] Date of Patent: Apr. 2, 1996

[54] MONOESTERS OF ROSIN ACID

[75] Inventors: Lawson G. Wideman; Paul H. Sandstrom, both of Tallmadge, Ohio

[73] Assignee: The Goodyear Tire & Rubber Company, Akron, Ohio

[21] Appl. No.: 419,481

[22] Filed: Apr. 10, 1995

Related U.S. Application Data

[62] Division of Ser. No. 72,259, Jun. 7, 1993.

[51] Int. Cl.$^6$ .................................................. C08K 5/34
[52] U.S. Cl. ........................... 524/91; 524/99; 524/100; 524/270; 524/271; 524/272; 524/274
[58] Field of Search .............................. 524/91, 99, 100, 524/270, 271, 272, 274

[56] References Cited

U.S. PATENT DOCUMENTS

| | | | |
|---|---|---|---|
| 1,923,938 | 8/1933 | Kyrides | 260/103 |
| 1,951,593 | 3/1934 | Bradley | 260/8 |
| 1,979,671 | 11/1934 | Butts | 260/99.4 |
| 2,369,125 | 2/1945 | Anderson | 260/104 |
| 4,478,993 | 10/1984 | Wideman et al. | 527/600 |
| 4,491,655 | 1/1985 | Sandstrom | 527/600 |
| 4,515,713 | 5/1985 | Wideman et al. | 260/106 |
| 4,758,379 | 7/1988 | Johnson, Jr. | 260/104 |
| 4,775,496 | 10/1988 | Wideman et al. | 260/102 |
| 4,946,879 | 8/1990 | Wideman et al. | 524/93 |
| 4,996,258 | 2/1991 | Wideman et al. | 524/274 |
| 4,996,295 | 2/1991 | Wideman et al. | 530/221 |
| 5,021,492 | 6/1991 | Sandstrom et al. | 524/274 |
| 5,021,493 | 6/1991 | Sandstrom | 524/347 |
| 5,037,956 | 8/1991 | Wideman et al. | 530/215 |
| 5,039,726 | 8/1991 | Wideman et al. | 524/271 |
| 5,049,607 | 9/1991 | Wideman et al. | 524/274 |

*Primary Examiner*—Peter D. Mulcahy
*Attorney, Agent, or Firm*—Bruce J. Hendricks

[57] ABSTRACT

The present invention relates to monoesters of rosin acids which are useful as a total or partial replacement for extender or processing oil in rubber formulations. Addition of these monoesters of rosin acid improve the modulus and tear of the vulcanizate. The monoesters are of the formula:

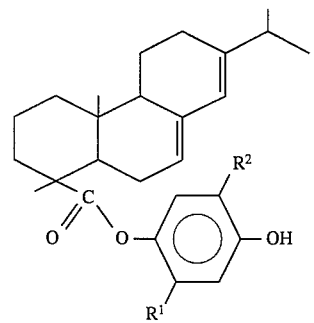

or

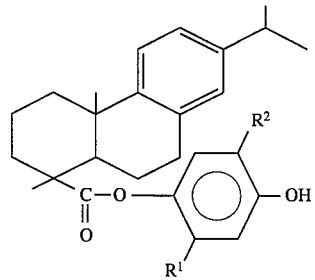

wherein $R^1$ and $R^2$ are the same or different hydrocarbon radicals selected from the group consisting of saturated alkyl and cycloalkyl radicals containing 3 to 20 carbon atoms, aryl radicals containing 6 carbon atoms and aralkyl radicals containing 7 to 20 carbon atoms.

12 Claims, No Drawings

MONOESTERS OF ROSIN ACID

This is a divisional of application Ser. No. 08/072,259, filed on Jun. 7, 1993, presently pending.

BACKGROUND OF THE INVENTION

Both natural and synthetic elastomers usually require the use of processing aids to assist mechanical breakdown and compounding. Materials such as mixtures of oil soluble sulfonic acids of high molecular weight with a high boiling alcohol, paraffin oils, blends of sulfonated petroleum products and selected mineral oils are conventionally used as processing aids. Additional examples include petroleum, paraffinic and vegetable oils, coal tar, petroleum residues or pitches and naturally occurring or synthetic resins.

One advantage in using processing aids is they assist the incorporation of fillers and other ingredients with low power consumption since they reduce internal friction in calendering and extrusion. By reducing the amount of friction during compounding, the temperature of the rubber will remain lower and thus minimize the possibility of scorch.

Various types of rosin acids have been used as extenders for high molecular weight SBR. See *Properties of GR-S Extended With Rosin Type Acids*, L. H. Howland, J. A. Reynolds, and R. L. Provost, Industrial and Engineering Chemistry, Vol. 45, No. 5, May 1953. Whereas reasonably good cured physical properties can be obtained with the rosin type acids, there are problems associated with their use which include cure retardation, high tack and poor low temperature performance, which limit their use as an extender in rubber formulations.

U.S. Pat. No. 4,491,655 discloses the use of methyl esters of rosin acid as total or partial replacement for oil in a rubber formulation. Compared with the use of aromatic extending oils in rubbers, methyl esters of rosin acids provide comparable processing and low temperature performance and superior abrasive resistance. Unfortunately, use of methyl esters of rosin acid does not benefit the vulcanizate properties related to rebound and tear. These properties are typically improved by the supplemental addition of a multitude of additives. The cost of compounding all these additives as well as the potential and detrimental interaction of these additives is preferably avoided.

U.S. Pat. No. 5,021,493 discloses the use of sulfur curable rubber compounds containing a 2,5-diorganohydroquinone. Unfortunately, use of a diorganohydroquinone does not provide a significant improvement in compound modulus and tear. Diorganohydroquinone must also be used at low levels (0.5–5 phr) since it affects cure rate by causing a rubber compound to become scorchy or having the tendency to premature cure. Therefore, there is a need for a single additive which can improve a number of properties while decreasing the cost and detrimental interaction by the addition of a multitude of compounds.

SUMMARY OF THE INVENTION

The present invention relates to monoesters of rosin acid. Use of the monoesters of rosin acid in a rubber vulcanizate improves the modulus and tear in the vulcanizate.

DETAILED DESCRIPTION OF THE INVENTION

There is disclosed a monoester of rosin acid of the formula:

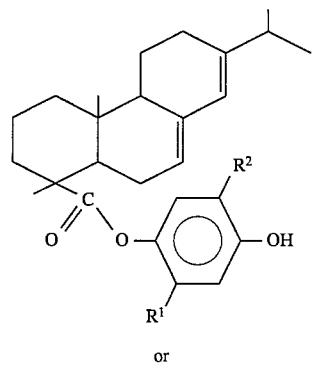

or

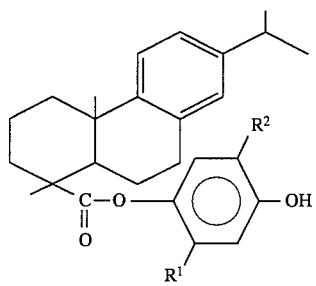

wherein $R^1$ and $R^2$ are the same or different hydrocarbon radicals selected from the group consisting of saturated alkyl and cycloalkyl radicals containing 3 to 20 carbon atoms, and aryl radicals containing 6 carbon atoms and aralkyl radicals containing 7 to 20 carbon atoms.

There is also disclosed a process for preparing rubber compositions which comprises admixing a rubber selected from the group consisting of natural rubber, homopolymers of conjugated diolefins, copolymers of conjugated diolefins and ethylenically unsaturated monomers or mixtures thereof with the above monoester of rosin acid.

There is also disclosed a rubber composition which comprises (1) a rubber selected from the group consisting of natural rubber, homopolymers of conjugated diolefins, copolymers of conjugated diolefins and ethylenically unsaturated monomers or mixtures thereof and the above monoester of rosin acid.

In accordance with the above structural formula, $R^1$ and $R^2$ are hydrocarbon radicals selected from saturated alkyl and cycloalkyl radicals containing 3 to 20 carbon atoms and aryl radicals containing 6 carbon atoms and aralkyl radicals containing 7 to 20 carbon atoms. Representative examples of alkyl radicals include propyl, butyl, amyl, hexyl, heptyl, octyl, nonyl and decyl radicals and their isomeric forms. In a preferred mode, $R^1$ and $R^2$ are hydrocarbon radicals selected from branched saturated alkyl and cycloalkyl radicals containing 3 to 6 carbon atoms. The alkyl radicals are tertiary radicals selected from tertiary butyl, amyl and hexyl. The most preferred mode is where $R^1$ and $R^2$ are each tertiary amyl radicals.

Rosin is a solid resinous material that occurs naturally in pine trees. The three major sources of rosin are gum rosin, wood rosin and tall oil rosin. Gum rosin is from the oleoresin extrudate of the living pine tree. Wood rosin is from the oleoresin contained in the aged stumps. Tall oil rosin is from the waste liquor recovered as a by-product in the Kraft paper industry.

The aged virgin pine stump is the source of wood rosin. The stump is allowed to remain in the ground for about ten years so that its bark and sapwood may decay and slough off to leave the heartwood rich in resin. It is known that production of pine stump rosin can be artificially stimulated by injecting the herbicide, Paraquat, into the lower portion of the tree. This treatment of the stump produces Pinex™ rosin.

Rosins derived from both oleoresin and aged stump wood are composed of approximately 90% resin acids and 10% nonacidic components. Chemical treatment of rosins, such as hydrogenation, dehydrogenation, or polymerization are known which produce modified rosins.

Rosin acids are monocarboxylic acids having the typical molecular formula, $C_{20}H_{30}O_2$. Examples of the resin acids are abietic, levopimaric, neoabietic, palustric, dehydroabietic, tetrahydroabietic, pimaric, isopimaric, Δ-isopimaric, elliotinoic and sandaracopimaric. Over the years nomenclature of individual acids has changed. IUPAC nomenclature names resin acids as derivatives of abietane. The two major rosin acid components are abietic acid having the following structural formula:

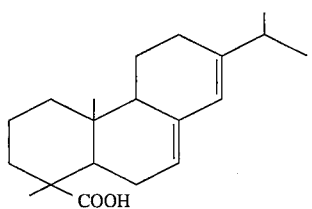

and dehydroabietic acid, having the structural formula:

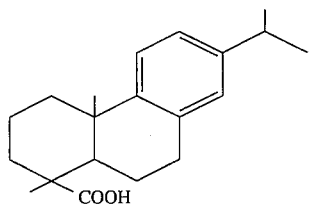

The acid number for the rosin acid may vary. Generally the acid number ranges from about 160 to about 175. Preferably the acid number is below 170 with a range of from about 165 to about 168 being particularly preferred.

The rosin acid or acids are reacted with a 2,5-diorganohydroquinone under esterification conditions.

The dialkyl hydroquinone is of the formula:

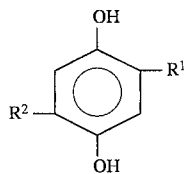

where $R^1$ and $R^2$ are the same or different hydrocarbon radicals selected from the group consisting of saturated alkyl and cycloalkyl radicals containing 3 to 20 carbon atoms, aryl radicals containing 6 carbon atoms and aralkyl radicals containing 7 to 20 carbon atoms. Representative examples of alkyl radicals include propyl, butyl, amyl, hexyl, heptyl, octyl, nonyl and decyl radicals and their isomeric forms. In accordance with the above structural formula, preferably $R^1$ and $R^2$ are hydrocarbon radicals selected from branched, saturated alkyl and cycloalkyl radicals containing 3 to 6 carbon atoms. In a particularly preferred mode, the alkyl radicals are tertiary radicals selected from tertiary butyl, amyl and hexyl. The most preferred mode is where $R^1$ and $R^2$ are each tertiary amyl radicals.

The mole ratio of the rosin acid to the 2,5-diorganohydroquinone may vary. Generally, the mole ratio of rosin acid to 2,5-diorganohydroquinone will range from about 0.5 to about 1.5. Preferably the mole ratio of rosin acid to 2,5-diorganohydroquinone is from about 0.6 to about 1.0.

The rosin acid or acids are reacted with the 2,5-diorganohydroquinone under esterification conditions to form the monoester of rosin acid. In addition to the monoesters of abietic acid and dehydroabietic acid, there may be present the monoesters derived from the 2,5-diorganohydroquinone and any of the following acids: levopimaric, neoabietic, palustric, tetrahydroabietic, pimaric, isopimaric, Δ-isopimaric, elliotinoic and sandaracopimaric.

An organic solvent may be used to dissolve the rosin acid, to increase heat transfer and to facilitate water removal through a reflux trap. The solvent is preferably inert to the esterification reaction. Illustrative of solvents suitable for use in the practice of this invention include: saturated and aromatic hydrocarbons, e.g., hexane, octane, dodecane, naphtha, decalin, tetrahydronaphthalene, kerosene, mineral oil, cyclohexane, cycloheptane, alkyl cycloalkane, benzene, toluene, xylene, alkyl-naphthalene, and the like; ethers such as tetrahydrofuran, tetrahydropyran, diethylether, 1,2-dimethoxybenzene, 1,2-diethoxybenzene, the mono and dialkylethers of ethylene glycol, propylene glycol, butylene glycol, diethylene glycol, dipropylene glycol, oxyethyleneoxypropylene glycol, and the like; fluorinated hydrocarbons that are inert under the reaction conditions such as perfluoroethane, monofluorobenzene, and the like. Another class of solvents are sulfones such as dimethylsulfone, diethylsulfone, diphenolsulfone, sulfolane, and the like. Mixtures of the aforementioned solvents may be employed so long as they are compatible with each other under the conditions of the reaction and will adequately dissolve the rosin acid and not interfere with the esterification reaction.

The esterification reaction may be conducted in the presence of a catalyst to speed up the reaction. Examples of catalysts that may be used include condensation catalysts, e.g., dibutyltin oxide or butyl stannoic acid. In addition acid catalysts may be used such as sulfuric acid, hydrochloric acid and toluenesulfonic acid. The amount of catalyst that is used will vary depending on the particular catalyst that is selected. For example, when an acid catalyst is used, from about 5 weight percent to about 10 weight percent is recommended.

The esterification reaction may be conducted over a variety of temperature ranges. The temperatures may range from moderate to an elevated temperature. In general, the esterification reaction may be conducted at a temperature ranging from about 100° C. to about 250° C. The preferred temperature range is from about 110° C. to about 200° C., while the most preferred temperature range is from about 120° C. to about 190° C.

The esterification reaction may be conducted over a variety of pressures. Preferably the reaction is conducted at a pressure range of from about 0 to about 100 psig.

The esterification reaction is conducted for a period of time sufficient to produce the desired monoester of rosin acid. In general, the reaction time can vary from minutes to several hours. If the more sluggish reaction conditions are selected, then the reaction time will have to be extended until the desired product is produced. It is appreciated that the residence time of the reactants will be influenced by the reaction temperature, concentration and choice of catalyst, if any, reaction pressure, concentration and choice of solvent, and other factors.

The esterification reaction may be carried out in a batch, semi-continuous or continuous manner. The esterification reaction may be conducted in a single reaction zone or in a plurality of reaction zones, in series or in parallel. The reaction may be conducted intermittently or continuously. The reaction may be conducted in a vessel equipped with a thermometer, stirrer and a distillation column to separate water that distills from reactants and optionally a Dean Stark trap. The reactor may be fitted with internal and/or external heat exchangers to control temperature fluctuations. Preferably, an agitation means is available to ensure a uniform reaction. Mixing induced by vibration, shaker, stirrer, rotating, oscillation, etc. are all illustrative of the types of agitation means which are contemplated for use in the esterification reaction. Such agitation means are available and well known to those skilled in the art.

Aside from functioning as a processing oil, addition of the monoester of rosin acid to sulfur vulcanizable elastomers enhances many physical properties of the vulcanizate. The term "rubber" or "elastomer" as used herein embraces both natural rubber and all its various raw and reclaim forms as well as various synthetic rubbers. Representative synthetic polymers are the homopolymerization products of butadiene and its homologues and derivatives, as for example, methylbutadiene, dimethylbutadiene, chloroprene (neoprene synthetic rubber) and pentadiene as well as copolymers such as those formed from butadiene or its homologues or derivatives with other unsaturated organic compounds. Among the latter are acetylenes, e.g., vinyl acetylene; olefins, for example, isobutylene, which copolymerizes with isoprene to form butyl rubber; vinyl compounds, for example vinylchloride, acrylic acid, acrylonitrile (which polymerizes with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Also included are the various synthetic rubbers prepared by the homopolymerization of isoprene and the copolymerization of isoprene with other diolefins and various unsaturated organic compounds. Additionally, included are the synthetic rubbers such as 1,4-cis polybutadiene and 1,4-cis polyisoprene and similar synthetic rubbers such as EPDM. The preferred rubbers for use with the present invention are natural rubber, polybutadiene, SBR and polyisoprene.

For the purposes of the present invention, the monoesters of rosin acid may be used as a methylene acceptor. The term "methylene acceptor" is known to those skilled in the art and is used to describe the reactant to which the methylene donor reacts to form what is believed to be a methylol monomer. The condensation of the methylol monomer by the formation of a methylene bridge produces the resin. The initial reactant that contributes the moiety that later forms into the methylene bridge is the methylene donor wherein the other reactant is the methylene acceptor.

For purposes of the present invention, the term "sulfur vulcanized rubber" is used herein to describe the vulcanized reaction product of the above rubbers described for use in the sulfur vulcanizable elastomers or rubbers.

The vulcanizable rubber compositions of the present invention may contain a methylene donor. The term "methylene donor" is intended to mean a compound capable of reacting with the monoester of rosin acid and generate the resin in-situ.

Examples of methylene donors which are suitable for use in the present invention include hexamethylene tetramine, hexaethoxymethylmelamine, hexamethoxymethylmelamine, lauryloxymethylpyridinium chloride, ethoxymethylpyridinium chloride, trioxan hexamethoxymethylmelamine, the hydroxyl groups of which may be esterified or partly esterified, and polymers of formaldehyde such as paraformaldehyde. In addition, the methylene donors may be N-substituted oxymethylmelamines, of the general formula:

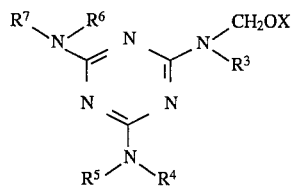

wherein X is an alkyl having from 1 to 8 carbon atoms, $R^3$, $R^4$, $R^5$, $R^6$ and $R^7$ are individually selected from hydrogen, an alkyl having from 1 to 8 carbon atoms, the group —$CH_2OX$ or their condensation products. Specific methylene donors include hexakis(methoxymethyl) melamine, N,N',N"-trimethyl/N,N',N"-trimethylolmelamine, hexamethylolmelamine, N,N',N"-dimethylolmelamine, N-methylolmelamine, N,N'-dimethylolmelamine, N,N',N"-tris-(methoxymethyl)melamine and N,N'N"-tributyl-N,N',N"-trimethylol-melamine. The N-methylol derivatives of melamine are prepared by known methods.

The weight ratio of methylene donor to the monoester of rosin acid may vary. Generally speaking, the weight ratio will range from about 1:10 to about 10:1. Preferably, the weight ratio ranges from about 1:3 to 3:1.

The methylene donor may be present in an amount ranging from about 0.5 to about 10 phr. Preferably, the methylene donor will be present in an amount ranging from about 0.5 to 5 phr.

The vulcanizates containing the monoesters of rosin acid find utility in, for example, motor mounts, rubber bushings, power belts, printing rolls, rubber shoe heels and soles, rubber floor tiles, caster wheels, elastomer seals and gaskets, conveyor belt covers, wringers, hard rubber battery cases, automobile floor mats, mud flaps for trucks, ball mill liners, and the like.

The monoesters of rosin acid may be used in a wide variety of proportions in the rubber and may be a substitute, in whole or part for conventional extender or process oils. By the term "extender or process oils", it is meant oils such as aromatic oils, naphthenic oils, paraffinic oils and the like as well as blends thereof. Specific examples of such oils include those largely composed of naphthenic and alkylated naphthenic hydrocarbons and mixtures thereof with various aromatic hydrocarbons. Such oils may be obtained from the high boiling fractions of the so-called naphthenic or mixed crude oils. They may comprise distillate fractions boiling above about 200° C. Suitable fractions are those at least 90 percent of which boil above about 250° C. as more volatile members may be lost during or after compounding and curing the rubber. Generally, the level of the monoesters of rosin acid that may be added to the rubber may range from about 2 phr (parts by weight per hundred parts by weight of rubber) to about 50 phr. Preferably the amount of monoesters of rosin acid that is added ranges from about 5 phr to about 35 phr.

In addition to the monoesters of the present invention, the rubber stock may containing conventional additives including fillers, pigments, zinc oxide, stearic acid, accelerators, sulfur vulcanizing agents, stabilizers, antidegradants, tackifiers, plasticizers, waxes, prevulcanization inhibitors, and the like. Representative of suitable fillers include carbon black, silica, titanium dioxide and clay which are typically added in amounts ranging from about 25 to about 125 phr depending on the application of the stock. Representative of conventional accelerators are amines, guanidines, thioureas, thiazoles, thiurams, sulfenamides, dithiocarbamates and xanthates which are typically added in amounts from about 0.2 to 5 phr. Representative of sulfur vulcanizing agents include elemental sulfur (free sulfur), or sulfur donating vulcanizing agents, for example, dithiocarbamate, polymeric polysulfide or sulfur olefin adducts. The amount of the sulfur vulcanizing agent will vary depending upon the type of rubber and particular type of sulfur vulcanizing agent but generally from about 0.1 phr to about 5 phr with a range of from about 0.5 to about 2 being preferred. Representative of the antidegradants which may be used in the rubber stock include monophenols, bisphenols, thiobisphenols, polyphenols, hydroquinone derivatives, phosphites, phosphate blends, thioesters, naphthylamines, diphenylamines as well as other diarylamine derivatives, para-phenylene diamines, quinolines and blended amines. Antidegradants are generally used in an amount ranging from about 0.10 phr to about 10 phr.

The monoester of rosin acid may be compounded in either the productive or nonproductive stock. Preferably, the monoester of rosin acid is compounded in the nonproductive stock because more uniform mixing is generally achieved. Incorporation of the monoester of rosin acid into the sulfur vulcanizable rubber may be accomplished by conventional means of mixing such as by the use of a Banbury or Brabender.

Cure properties were determined using a Monsanto oscillating disc rheometer which was operated at a temperature of 150° C. and at a frequency of 11 hertz. A description of oscillating disc rheometers can be found in the Vanderbilt Rubber Handbook edited by Robert O. Babbit (Norwalk, Conn., R. T. Vanderbilt Company, Inc., 1978), pages 583–591. The use of this cure meter and standardized values read from the curve are specified in ASTM D-2084. A typical cure curve obtained on an oscillating disc rheometer is shown on page 588 of the 1978 edition of the Vanderbilt Rubber Handbook.

In such an oscillating disc rheometer, compounded rubber samples are subjected to an oscillating shearing action of constant amplitude. The torque of the oscillating disc embedded in the stock that is being tested is required to oscillate the rotor at the vulcanization temperature. The values obtained using this cure test are very significant since changes in the rubber or the compounding recipe are very readily detected. It is obvious that it is normally advantageous to have a fast cure rate.

Some of the following tables report cure properties that were determined from cure curves that were obtained for the various rubber formulations that were prepared. These properties include the minutes to 90% of the torque increase (t90 min.).

Peel adhesion testing was done to determine the interfacial adhesion between various rubber formulations that were prepared. The interfacial adhesion was determined by pulling one compound away from another at a right angle to the untorn test specimen with the two ends being pulled apart at a 180° angle to each other using an Instron machine. The area of contact was determined from placement of a Mylar sheet between the compounds during cure. A window in the Mylar allowed the two materials to come into contact with each other during curing and subsequent testing.

The following examples are presented in order to illustrate but not limit the present invention.

EXAMPLE 1

Preparation of the Monoester Derived From Rosin Acid and 2,5-ditertiary Amyl Hydroquinone 150 grams (0.5 mole) of tall oil rosin acid and 75 grams (0.5 mole) of 2,5-ditertiary amyl hydroquinone were added to 11 grams of toluenesulfonic acid in 130 ml of xylene and charged into a Dean-Stark equipped 1-liter round bottom flask. After 12 hours of reflux at a pot temperature of about 167° C., 9.5 ml of water was collected. The reaction product was stripped of volatiles at 28 in. of Hq vacuum at 160° C.

The product was a dark friable solid. Infrared analysis showed disappearance of the acid carbonyl function and appearance of the ester carbonyl function at 1735 $cm^{-1}$. The acid number was 25. The proton nuclear magnetic resonance showed disappearance of the acid proton.

EXAMPLE 2

Physical Testing

Table I below shows the basic rubber compounds that were used in this example. The rubber compound was prepared in a three-stage Banbury mix. All parts and percentages are by weight unless otherwise noted.

The various samples were prepared using the respective amount (phr) of processing oil or monoester of Example 1 listed in Table II. The physical data for each sample are also listed in Table II.

TABLE I

| | A | B |
|---|---|---|
| 1st Non-Productive | | |
| Natural rubber (#2 ribbed smoked sheet) | 100.0 | 100.0 |
| SAF Carbon black | 15.0 | 15.0 |
| 2nd Non-Productive | | |
| SAF Carbon black | 35.0 | 35.0 |
| Processing Oil (Naphthenic/Paraffinic) | 5.0 | 0 |
| Stearic Acid | 1.0 | 1.0 |
| Zinc Oxide | 5.0 | 5.0 |
| Antioxidant | 2.0 | 2.0 |
| Monoester of Example 1 | 0 | 5.0 |
| Productive | 3.1 | 3.1 |
| Sulfur, Accelerator, Retarder | | |

TABLE II

Cure Behavior and Vulcanizate Properties

| | Compound A Naphthenic/ Paraffinic Oil | Compound B Monoester of Rosin Acid[(1)] |
|---|---|---|
| Rheometer 150° C. | | |
| Max. Torque | 41.4 | 41.9 |
| Min. Torque | 11.3 | 11.2 |
| t90, minutes | 20.9 | 21.8 |
| t24, minutes | 14.0 | 14.3 |
| Stress Strain (original) | | |
| Tensile Strength, MPa | 20.4 | 22.1 |
| Elongation at Break (%) | 494 | 517 |
| 100% Modulus (MPa) | 2.1 | 2.4 |
| 300% Modulus (MPa) | 11.4 | 12.2 |
| Strebler to Itself, 95° C., (Newtons) | 215 | 278 |

TABLE II-continued

Cure Behavior and Vulcanizate Properties

|  | Compound A Naphthenic/ Paraffinic Oil | Compound B Monoester of Rosin Acid[1] |
|---|---|---|
| Hardness, Shore A (ASTM D1415) | | |
| Room Temperature | 61.4 | 69.6 |
| 100° C. | 55.3 | 61.0 |
| Rebound (ASTM D1054) | | |
| Room Temperature (%) | 45.7 | 41.7 |
| 100° C. (%) | 57.1 | 53.4 |

[1]Prepared in Example 1.

As can be seen from the above data, the Strebler values for the compound containing monoester of rosin acid are significantly higher than for the compound containing the prior art processing aids. The results also show a higher tensile strength at break and higher hardness with the use of the monoester of rosin acid.

EXAMPLE 3

Physical Testing

Table III below shows the basic rubber compounds that were used in this example. The rubber compounds were prepared in a three-staged Banbury mix. All parts and percentages are by weight unless otherwise noted.

The various samples were prepared using the respective amount (phr) of the ingredients listed in Table III. Table IV lists the physical data for each sample.

TABLE III

|  | A | B | C |
|---|---|---|---|
| 1st Non-Productive | | | |
| Natural Rubber (#2 ribbed smoked sheet) | 100.0 | 100.0 | 100.0 |
| SAF Carbon Black | 15.0 | 15.0 | 15.0 |
| 2nd Non-Productive | | | |
| SAF Carbon Black | 35.0 | 35.0 | 35.0 |
| Processing Oil | 5.0 | 5.0 | 5.0 |
| Stearic Acid | 1.0 | 1.0 | 1.0 |
| Zinc Oxide | 5.0 | 5.0 | 5.0 |
| Antioxidant | 2.0 | 2.0 | 2.0 |
| Resorcinol | 0 | 0.75 | 0 |
| Monoester of Example 1 | 0 | 0 | 3.6 |
| Productive | | | |
| Sulfur, Accelerator, Retarder | 3.1 | 3.1 | 3.1 |
| Hexamethylenetetramine | 0 | 1.5 | 1.5 |

TABLE IV

|  | C | D | E |
|---|---|---|---|
| Resorcinol | 0 | 0.75 | 0 |
| Monoester of Example 1 | 0 | 0 | 3.6 |
| Hexamethylenetetramine | 0 | 1.5 | 1.5 |
| Rheometer, 150° C. | | | |
| Max. Torque | 41.1 | 49.4 | 45.0 |
| Min. Torque | 9.9 | 11.7 | 10.9 |
| t90 (minutes) | 17.9 | 18.1 | 16.7 |
| t25 (minutes) | 11.4 | 8.9 | 9.5 |

TABLE IV-continued

|  | C | D | E |
|---|---|---|---|
| Stress-Strain | | | |
| Tensile Strength (MPa) | 18.8 | 23.6 | 22.0 |
| Elongation at Break (%) | 450 | 465 | 509 |
| 100% Modulus, (MPa) | 2.3 | 3.0 | 2.5 |
| 300% Modulus (MPa) | 12.1 | 15.4 | 12.4 |
| Rebound (ASTM D1054) | | | |
| Room Temperature (%) | 43.8 | 48.6 | 46.5 |
| 100° C. (%) | 56.5 | 58.4 | 56.9 |
| Shore A Hardness | | | |
| Room Temperature | 62.7 | 69.3 | 67.3 |
| 100° C. | 54.7 | 63.7 | 59.6 |
| Peel Adhesion (95° C.) | | | |
| To Itself (Newtons) | 181 | 165 | 186 |
| Rheovibron | | | |
| E' at 60° C. (MPa) | 15.0 | 21.7 | 23.6 |
| Tan Delta at 60° C. | 0.123 | 0.084 | 0.088 |

As can be seen from the above data, the monoester of rosin acid can also be used as a replacement for resorcinol in combination with hexamethylenetetramine to provide improved modulus and hardness properties.

What is claimed is:

1. A process for improving the physical properties of rubber compositions which comprises (i) admixing a rubber selected from the group consisting of natural rubber, homopolymers of conjugated diolefins, copolymers of conjugated diolefins and ethylenically unsaturated monomers or mixtures thereof with (a) a monoester of rosin acid of the formula:

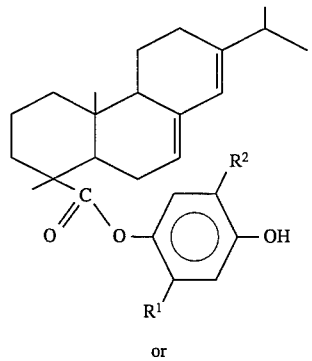

or

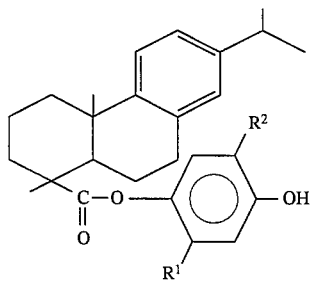

wherein $R^1$ and $R^2$ are the same or different hydrocarbon radicals selected from the group consisting of saturated alkyl and cycloalkyl radicals containing 3 to 20 carbon atoms, aryl radicals containing 6 carbon atoms and aralkyl radicals containing 7 to 20 carbon atoms and (b) from 0.5 to 10 phr of a methylene donor; and (ii) vulcanizing the rubber composition.

2. The process of claim 1 wherein said hydrocarbon radicals are selected from branched, saturated alkyl and cycloalkyl radicals containing 3 to 6 carbon atoms.

3. The process of claim 1 wherein said alkyl radicals are selected from propyl, butyl, amyl, hexyl, heptyl, octyl, nonyl and decyl radicals and their isomeric forms.

4. The process of claim 2 wherein said alkyl radicals are tertiary radicals selected from tertiary butyl, amyl and hexyl.

5. The process of claim 4 wherein said radicals are tertiary amyl radicals.

6. A process for preparing rubber compositions according to claim 1 wherein the monoester of rosin acid is at a concentration of from about 2 parts by weight per one hundred parts by weight rubber to 50 parts by weight per one hundred parts by weight rubber.

7. The process of claim 1 wherein said monoester of rosin acid is added to a rubber selected from the group consisting of natural rubber, polybutadiene, styrene-butadiene rubber, polyisoprene or mixtures thereof.

8. The process of claim 6 wherein said monoester of rosin acid is at a concentration of from about 5 parts by weight per one hundred parts by weight rubber to 35 parts by weight per one hundred parts by weight rubber.

9. The process of claim 1 wherein the methylene donor is selected from the group consisting of hexamethylene tetramine, hexamethoxymethyl melamine, lauryloxymethyl pyridinium chloride, ethyloxymethyl pyridinium chloride, trioxan hexamethylolmelamine and paraformaldehyde.

10. The process of to claim 1 wherein the methylene donor is selected from the general formula:

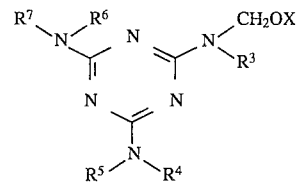

wherein X is an alkyl having from 1 to 8 carbon atoms, $R^3$, $R^4$, $R^5$, $R^6$ and $R^7$ are individually selected from the group consisting of hydrogen, an alkyl having from 1 to 8 carbon atoms, the group $-CH_2OX$ or their condensation products.

11. The process of claim 1 wherein the methylene donor is selected from the group consisting of hexakis-(methoxymethyl)melamine, N,N',N"-trimethyl/N,N',N"-trimethylolmelamine, hexamethylolmelamine, N,N',N"-dimethylolmelamine, N-methylolmelamine, N,N'-dimethylolmelamine, N,N',N"-tris(methoxymethyl)melamine and N,N'N"-tributyl-N,N',N"-trimethylol-melamine.

12. The process of claim 1 wherein the weight ratio of methylene donor to the monoester of rosin acid may range from about 1:10 to about 10:1.

* * * * *